(12) United States Patent  
Seitz

(10) Patent No.: US 7,051,756 B2  
(45) Date of Patent: May 30, 2006

(54) TWO STAGE METERED RELIEF CHECK VALVE

(75) Inventor: Gary L. Seitz, Decatur, IN (US)

(73) Assignee: Tokheim Holding B.V., Bladel (NL)

( * ) Notice: Subject to any disclaimer, the term of this patent is extended or adjusted under 35 U.S.C. 154(b) by 232 days.

(21) Appl. No.: 10/222,710

(22) Filed: Aug. 16, 2002

(65) Prior Publication Data

US 2003/0056832 A1 Mar. 27, 2003

Related U.S. Application Data

(60) Provisional application No. 60/313,169, filed on Aug. 17, 2001.

(51) Int. Cl.
*F16K 15/06* (2006.01)
*B01D 35/04* (2006.01)

(52) U.S. Cl. .................. 137/469; 137/543.23; 137/550

(58) Field of Classification Search ................ 137/469, 137/543.23, 515, 515.7, 454.2, 550
See application file for complete search history.

(56) References Cited

U.S. PATENT DOCUMENTS

| | | | | |
|---|---|---|---|---|
| 170,974 A | * | 12/1875 | Westwater | 137/543.23 |
| 438,471 A | * | 10/1890 | Cunneen et al. | 137/543.23 |
| 1,124,203 A | * | 1/1915 | Bingley | 137/469 |
| 1,687,209 A | * | 10/1928 | Holmes | 137/543.23 |
| 2,377,132 A | * | 5/1945 | Crowe | 137/543.23 |
| 4,273,155 A | * | 6/1981 | Euerle | 137/515.7 |
| 4,543,986 A | * | 10/1985 | Byrne | 137/515.7 |
| 4,590,962 A | * | 5/1986 | Tespa | 137/550 |
| 4,622,994 A | * | 11/1986 | Rosaen | 137/543.23 |
| 5,176,175 A | * | 1/1993 | Farnham et al. | 137/543.23 |
| 5,240,037 A | * | 8/1993 | Guinn | 137/515.7 |

* cited by examiner

*Primary Examiner*—John Rivell
(74) *Attorney, Agent, or Firm*—Randall J. Knuth

(57) ABSTRACT

A pressure relief valve includes a cylindrical poppet having a fluid metering stem. The valve is configured such that the effective surface area of the transverse aspect of the poppet exposed to fluid pressure during a closed valve condition is greater than the effective surface area of the transverse aspect of the poppet exposed to fluid pressure during an open valve condition. This feature creates a narrow spread for cracking to reseat pressure points since the surface area of the poppet available to experience fluid-related pressure is reduced as the valve moves from its closed to open position. While closed, the poppet is exposed to fluid pressure at the axial end face of the stem and at an annular end face portion of the poppet defined by the clearance between the stem and fluid channel. While open, the poppet experiences fluid pressure at the end face of the stem.

53 Claims, 3 Drawing Sheets

TWO STAGE METERED RELIEF CHECK VALVE

This application claims the benefit of Provisional Application No. 60/313,169, filed Aug. 17, 2001.

BACKGROUND OF THE INVENTION

1. Field of the Invention

The present invention relates to a pressure relief check valve, and, more particularly, to a valve assembly including a poppet with a fluid metering stem to regulate the passage of fluid through the valve, such as during a cracking mode and other open valve conditions.

2. Description of the Related Art

Conventional relief valves typically employ a check ball that serves both as the valve mechanism and seal. During operation, after the cracking pressure has been reached, the check ball will rise under the influence of the fluid pressure and create space about the ball surface to enable fluid to flow past and exit the valve. In typical designs, the intake and exhaust ports will be positioned at opposite sides of the check ball in a diametrically opposing configuration. Accordingly, fluid will flow over and around the check ball as it traverses the pressure relief path defined by the valve.

Conventional valve designs possess various drawbacks, such as susceptibility to leaking because of particulate contamination, a large spread for cracking pressure points to reseat pressure points, a high flow rate at full flow condition, and poor consistency of operating points.

Regarding the spread for cracking pressure points to reseat pressure points in a check ball valve design, the fluid mechanics relating to its operation do not permit the valve to exhibit the momentary open/close characteristic desired for the cracking state. After the point of cracking has been reached in a check ball design, the surface area that experiences the hydraulic force induced by the fluid pressure (both statically and dynamically) increases as the check ball becomes unseated and moves away from the valve seat. Standard poppet valve designs also exhibit the same behavior vis-à-vis the increase in the pressure bearing surface area after cracking pressure has been achieved.

This variation in the surface area as the valve opens is an inherent feature of standard valve designs that occurs normally during valve operation. In check ball designs, for example, it is seen that the increased surface area exposed to the fluid pressure corresponds to the increased amount of surface area of the spherical check ball that the fluid must travel along to reach the relief port. Therefore, assuming that the pressure differential remains the same across the valve, the fluid pressure will exert a force upon the check ball that is directly proportional to the area over which the force is acting. This relationship is readily seen in the definition of pressure, namely, force per unit area.

As the surface area exposed to fluid pressure increases, there will then be a corresponding increase in the pressure-related force that acts upon the ball. This increase in the force exerted upon the ball acts to enlarge the crack created at the interface between the check ball and valve seat and thereby admit more fluid into the exhaust port. The force continues to increase as the crack widens and more surface area of the check ball is exposed to the fluid pressure. The force will increase, unless otherwise dampened or impeded, until a full open condition is reached. It may happen, then, that even though only a cracking action is desired, a continuous flow condition may ensue that results in unwanted and prolonged loss of fluid.

The rising force level not only acts at cross-purposes to the desired cracking behavior (i.e., a momentary on/off response), but imposes a limitation on the valve design in terms of its responsiveness to pressure changes aimed at reseating the valve. The automatic tendency of the check ball (at constant pressure) to continue its displacement away from the valve seat in apparent self-perpetuating fashion means that any attempt to reseat the check ball will require a not insignificant decrease in pressure to counteract or otherwise compensate for the increased surface area exposed to fluid pressure.

Generally, the fluid pressure will have to be reduced to a level that enables the force of the closing mechanism (e.g., spring) to exceed the oppositely directed force established by the fluid pressure. This results in the large spread between cracking pressure point and reseat pressure point.

The required pressure drop will likely diminish or at least temporarily adversely affect the throughput of the fluid delivery system that uses the check ball valve. In a fuel dispenser, for example, this diminished performance would be an unacceptable operating factor that a site operator would not want a customer to experience during refueling.

The force increase attending check ball valves would typically be addressed by monitoring the condition of the valve and incorporating a functionality that quickly reduces the valve pressure after the cracking condition has been detected. In this manner, the valve is not given a chance to rapidly advance towards a full open condition, which otherwise would happen if the pressure differential across the valve remained constant. This additional functionality, however, adds complexity and cost to the valve design.

The increase in surface area (and the corresponding increase in force acting against the check ball) also makes it difficult to implement a controlled level of pressure relief and/or fluid release. This control aspect would involve a metering behavior that can be precisely regulated to allow gradual and progressive changes in the metered fluid flow in response to pressure changes. However, due to the automatic rise in pressure-related force as the check ball unseats following the onset of the cracking point, a conventional valve may reach its full open condition without little or any variation in the fluid pressure.

There exists, then, a narrow spread between the cracking reseat point and the full flow reseat point in check ball valve designs. More particularly, the pressure range between cracking point and a full open condition is relatively small. It would be more preferable that the valve advance from cracking to full open in response to a progressive increase in the fluid pressure, i.e., a relatively wider pressure range.

Various other drawbacks are evident with valve constructions using a check ball. For example, check ball designs do not have a feature that limits the compression of the bias spring. Check ball designs also can be affected by misalignment errors as the normally displaced ball drifts sideways and is pushed away from axial registration with the valve seat. This causes a single point contact between the ball and seat, resulting in a cantilever effect that lowers the reseating pressure points.

SUMMARY OF THE INVENTION

According to one embodiment of the present invention, there is provided a pressure relief check valve configured to meter (i.e., controllably regulate) the release of fluid, such as during a cracking mode and other intermediate open states progressively advancing towards a full open mode. In one form, the valve has two principal operating modes, namely, a cracking state and a full open state.

The valve is preferably installed at the upstream end (e.g., proximate the inlet) or the downstream end (e.g., proximate the outlet) of a fluid delivery system. For example, the valve may find use in a fuel dispenser at a refueling site, where it could be incorporated into the hose and nozzle assembly (user end) or underground fuel transport line (supply end).

In one form, the valve assembly includes a poppet with a fluid metering stem. The poppet preferably is provided in the form of a right circular cylindrical shape having the stem extend from one of the bases of the poppet cylinder. A housing is provided having a fluid inlet end and a fluid outlet end disposed in fluid communication with one another.

The stem is slidably received within a fluid channel formed in the fluid outlet end of the housing. During operation, the stem is axially displaceable within the fluid channel to functionally provide a metered dispensation of fluid which encounters the poppet after flowing through the housing. The metered fluid exits the valve through an appropriate relief port.

An elongate receptacle includes an inner chamber that extends axially from an open end of the receptacle to an intermediate point along the axis of the receptacle. The inner chamber is sufficiently dimensioned to fully receive the poppet and metering stem.

For purposes of assembly, the housing unit includes an appropriately sized neck portion that is securely received within the inner chamber of the receptacle by a press fit connection. The neck portion of the housing has a throat region that defines the fluid channel receiving the fluid metering stem.

The side of the poppet opposite the location of the fluid metering stem includes another stem that receives a biasing spring. The spring maintains the valve in a closed position until a threshold pressure is reached that overcomes the biasing force of the spring and enables the poppet to move.

The poppet is suitably configured such that it presents a surface area experiencing fluid-related pressure during a closed condition that is greater than the poppet surface area experiencing fluid-related pressure during an open condition. This reduction in poppet surface area which is exposed to fluid pressure as the poppet moves from a closed position to an open position has the effect of creating a self-closing feature.

In particular, since the pressure differential across the valve remains the same, the decrease in surface area causes a corresponding decrease in the effective force acting upon the poppet from the fluid pressure. Thus, at the moment when the fluid pressure exceeds the threshold cracking pressure and the poppet moves, there develops a concurrent decrease in the effective surface area exposed to the fluid pressure, which lowers the pressure-related force acting upon the poppet to a level below that of the spring-related biasing force.

The spring action momentarily then attempts to snap the valve close by axially displacing the poppet and restoring it to its former seating position. In effect, the valve behaves in a manner following cracking activity that normally tends to reseat the poppet, despite relatively little or no change in the pressure differential across the valve.

In one form of the invention, the effective surface area of the poppet exposed to fluid pressure during a closed condition is defined principally by two main surface features that are disposed transversally to the direction of fluid flow. First, the axial end face of the fluid metering stem. Second, the exposed portion of the axial end face of the poppet from which the fluid metering stem extends or projects. This exposed portion of the poppet end face will have a transverse extent equivalent to the transverse dimension of the clearance space defined between the fluid channel sidewalls and the fluid metering stem. The exposed portion of the poppet end face will have an annular shape.

During the closed condition, the axial end face of the poppet seatingly engages a valve seat defined at the upper side of the housing.

In one form of the invention, the effective surface area of the poppet exposed to fluid pressure during an open condition is defined principally by one main surface feature, namely, the axial end face of the fluid metering stem. During the open condition, as the poppet rises from its seating position relative to the valve seat, a transverse passageway is formed between the valve seat and the portion of the poppet end face opposing the valve seat. This transverse passageway connects to a relief port or orifice formed in the side of the elongate receptacle. Preferably, more than one relief orifice is provided to facilitate multiple pressure relief routes.

Fluid is directed out of the valve in a direction substantially transverse to the axial dimension of the valve assembly and also to the direction of fluid flow through the housing.

One advantage of the present invention is that the poppet configuration creates a narrow spread for cracking to reseat pressure points.

Another advantage of the present invention is that the narrow spread for cracking to reseat pressure points is sufficient to enable pressure relief to be accomplished, while not allowing an undue amount of fluid to escape through the valve.

Another advantage of the invention is that pressure relief and/or fluid release can be precisely metered due to the high level of pressure responsivity attending the operation of the poppet-stem combination.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
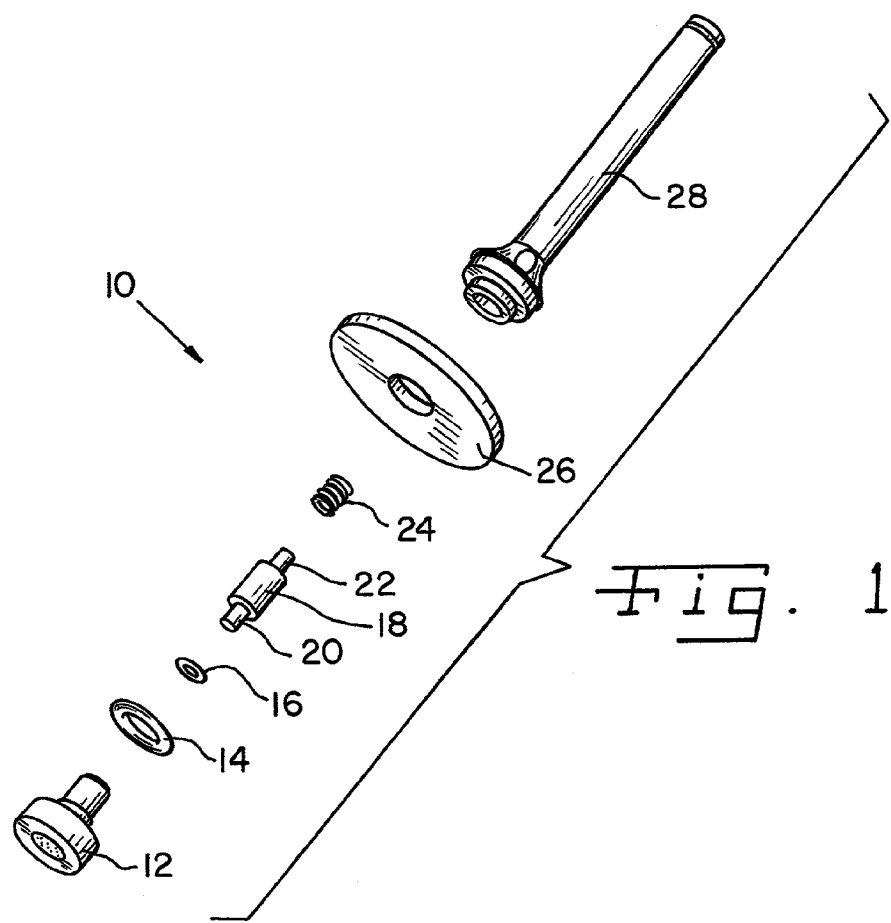
FIG. 1 is an exploded perspective view indicating the various components of a valve device, according to one embodiment of the present invention.
Figure 2:
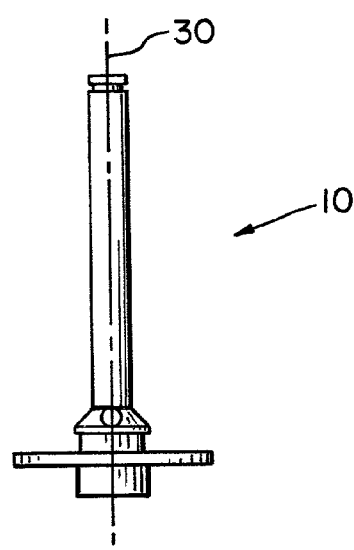
FIG. 2 is a planar perspective view of the valve device of FIG. 1, as configured in its fully assembled and ready for installation form.

Referring now to the drawings and particularly to FIG. 1, there is shown a pressure relief valve 10 in exploded perspective view, in accordance with the present invention. FIG. 2 shows valve 10 in its fully assembled form suitable for installation.

The illustrated valve 10 includes, in combination, a housing or orifice assembly 12, a lower O-ring 14, an upper O-ring 16, a poppet 18 having dual sided stems 20 and 22, a bias spring 24, a poppet disc 26, and a check valve stem piece or receptacle 28 to house poppet 18 (among other components). As assembled, these parts will be arranged in cooperative working relationship with one another and also aligned substantially coaxially with one another about main valve axial line 30 (FIG. 2).

Figure 3:
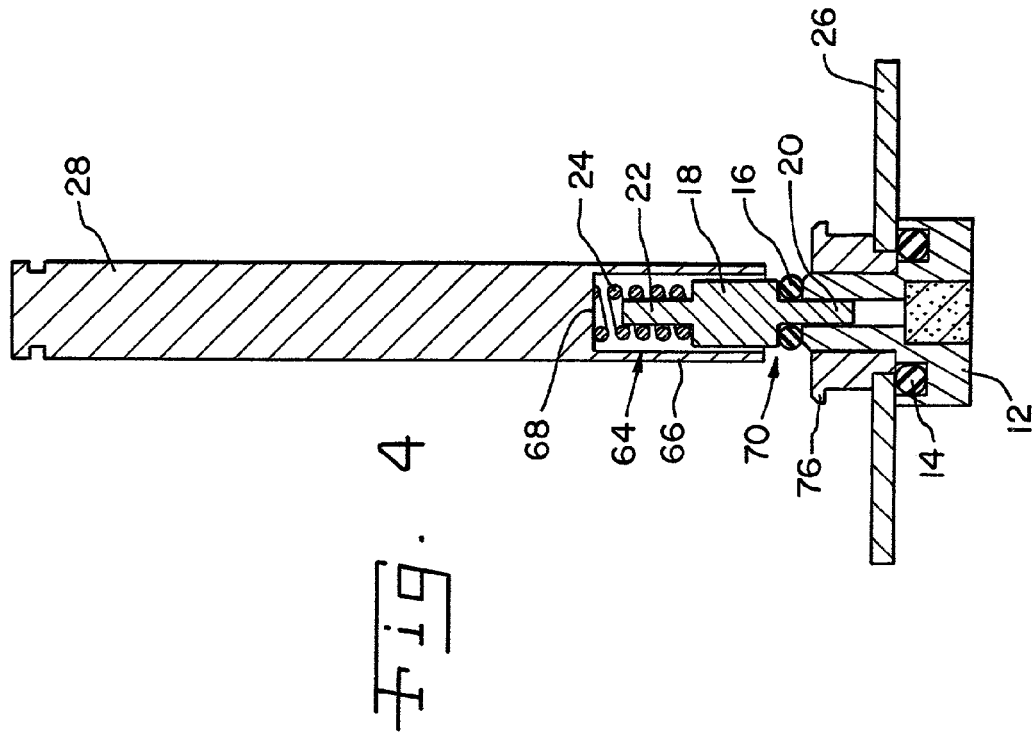
FIG. 3 is an axial cross-sectional view of the valve device of FIG. 2 illustrating (among other things) the manner in which the valve poppet and stem combination are fully enclosed within the device.
Figure 4:
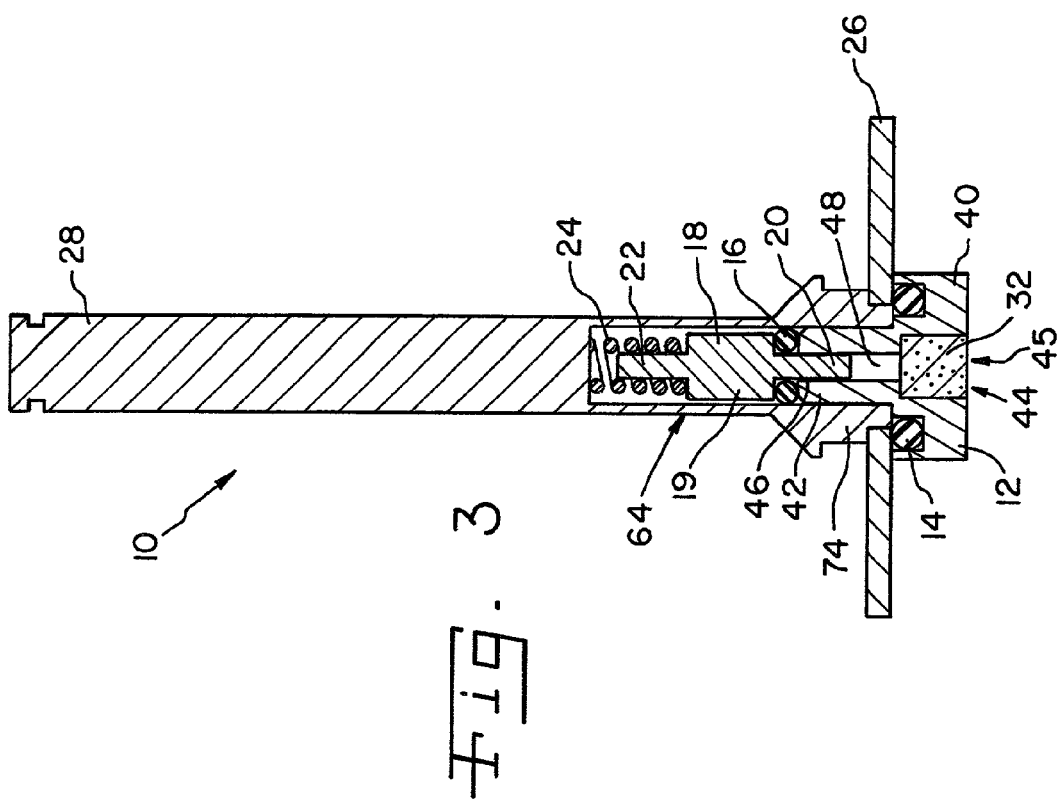
FIG. 4 is an axial cross-sectional view of the valve device of FIG. 2 illustrating (among other things) the spatial relationship of the pressure relief ports to the valve poppet and stem combination.

Brief reference is also made to FIGS. 3–6. FIG. 3 shows an axial cross-sectional view of valve 10 taken along axial line 30. The plane of cross-section is chosen to illustrate, inter alia, the full length of receptacle 28 and the manner in which poppet 18 is fully housed within receptacle 28. FIG. 4 shows an axial cross-sectional view of valve 10 taken along axial line 30, where the plane of cross-section is chosen to illustrate, inter alia, the pressure relief ports formed as openings or windows in the side of receptacle 28. The transformation between the views of FIGS. 3 and 4 occurs through a 90° rotation of valve 10 about its principal axis.

Figure 6:
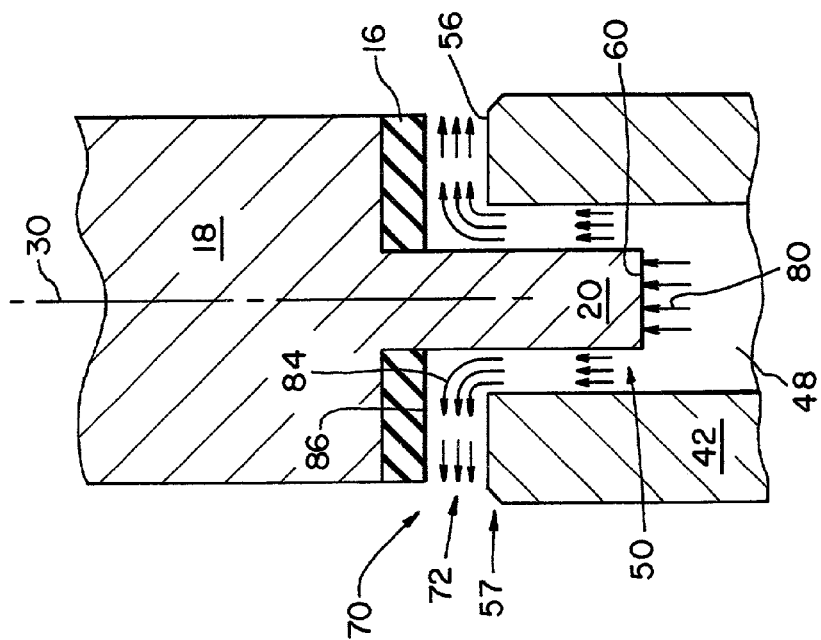
FIG. 6 is a fragmentary cross-sectional view of the device in FIG. 2 to illustrate in exaggerated form the position of the valve poppet and stem combination during an open valve condition.
Figure 5:
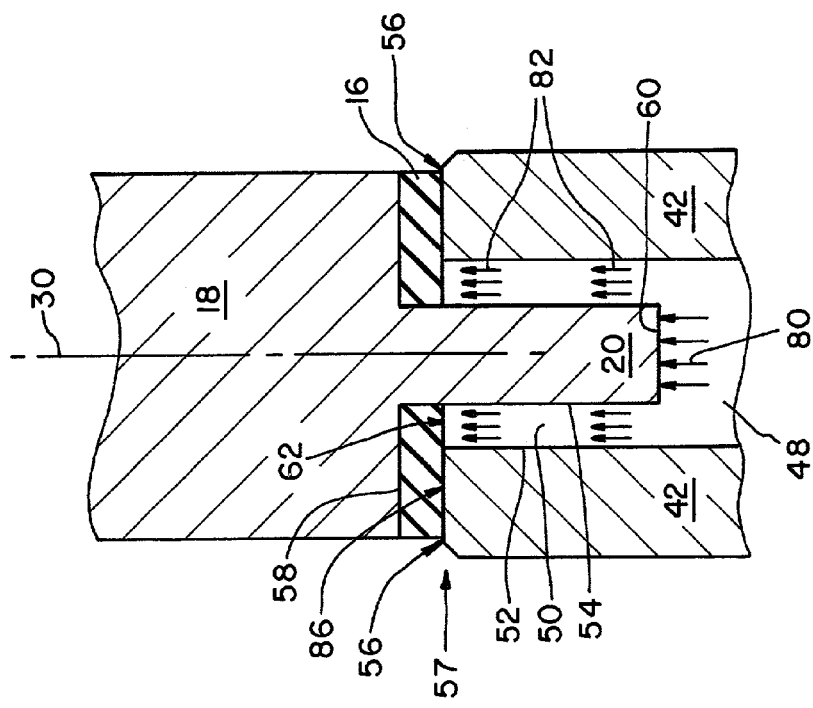
FIG. 5 is a fragmentary cross-sectional view of the device in FIG. 2 to illustrate in exaggerated form the position of the valve poppet and stem combination during a closed valve condition.

FIG. 5 represents an exaggerated fragmentary view of valve 10 derived from the cross-sectional view of FIG. 4 to illustrate the position of poppet 18 and stem 20 during a closed valve condition. Similarly, FIG. 6 represents an exaggerated fragmentary view of valve 10 derived from the cross-sectional view of FIG. 4 to illustrate the position of poppet 18 and stem 20 during an open valve condition. This open valve condition encompasses every configuration of poppet 18 that accommodates the release of fluid, such as a cracking condition, full open condition, and other intermediate positions.

Reference is now made to FIG. 1 in conjunction with FIGS. 3–5.

The illustrated housing 12 is generally representative of any means by which fluid flow 45 is admitted into valve 10 and communicated to the metering mechanism, i.e., poppet 18 in combination with fluid metering stem 20. For this purpose, housing 12 defines a fluid inlet 44 disposed at an upstream end thereof and a fluid outlet 46 disposed at a downstream end thereof. The fluid inlet 44 and fluid outlet 46 are arranged in fluid communication with one another.

In one illustrative form, housing 12 includes a lower base or pedestal portion 40 and an upper neck portion 42. Base portion 40 has a generally cylindrically-shaped construction, while neck portion 42 has a generally tubular-shaped construction. Neck portion 42 defines a throat region 48 that serves variously as a fluid channel and to slidably receive stem 20 of poppet 18. The orifice formed at the upper end of throat region 48 defines fluid outlet 46 of housing 12. The operative movement of poppet 18 is accurately guided (via stem 20) by channel 48. In this manner, stem 20 serves as a pilot mechanism for poppet 18, in addition to its principal fluid metering function.

An axially-extending transverse clearance 50 is formed between sidewalls 52 of fluid channel 48 and opposing sidewalls 54 of stem 20, as best seen in FIGS. 5 and 6.

The uppermost end of neck portion 42 defines a substantially planar surface 56 that serves as a valve seat to seatingly receive poppet 18 during a closed valve condition (FIG. 5). The valve seat is generally illustrated at 57.

Valve 10 is preferably equipped with a filter element 32 for filtering the incoming fluid stream 45 before it reaches the metering mechanism. In one form, filter 32 is disposed at the inlet end 44 of housing 12. For example, filter 32 may be located within an antechamber that immediately precedes fluid channel 48. In one form, the inlet filter is a sintered bronze filter that can be easily sized to fit into housing 12.

Filter 32 should substantially coextend with the housing orifice that defines the fluid input port so that the entire fluid stream is filtered. Filter 32 will be provided in a form suitable for the specific application. In particular, filter 32 will have a permeability and porousness suited to the fluid type, flow rate, and expected contaminants. For example, in a refueling environment, filter 32 will be able to process and otherwise handle a fuel flow.

The illustrated poppet 18 is preferably provided in the form of a right circular cylindrical body portion 19 having bases in the form of circular-shaped axial end faces, such as end face 58 proximate stem 20 (FIG. 5). In particular, the fluid metering stem 20 extends axially from poppet end face 58 and is slidably disposed within channel 48 formed in housing 12. During operation, as discussed further, stem 20 is axially displaceable within and guided by channel 48. Stem 20 is also preferably provided in the form of a shaft-like right circular cylinder having an exposed distal end face 60.

Poppet 18 is preferably configured within valve 10 such that its end face 58 is oriented transversally to the direction of incoming fluid, which generally flows along the direction coinciding with the axial dimension 30 of valve 10. As discussed further in connection with FIG. 6, this geometrical feature of poppet 18 enables fluid to be redirected by 90° before exiting valve 10 at a radial relief port formed in receptacle 28.

Poppet 18 is assembled with a disc-shaped O-ring element 16 annularly disposed about stem 20 and engaged with poppet axial end face 58. As shown best in FIG. 5, the outer axial surface 86 (FIG. 6) of O-ring 16 distal from poppet end face 58 provides the bearing surface which engages with valve seat 57 (i.e., upper surface 56 of neck portion 42) during a closed valve condition, i.e., when poppet 18 is seated upon housing 12 at valve seat 57.

O-ring 16 serves to provide a temporary seal between poppet 18 and valve seat 57 that prevents fluid from flowing therebetween during a closed valve condition. For purposes herein, O-ring 16 is considered a part of poppet 18 when making references to the surface area of poppet 18, particularly in regard to the pressure influence exerted upon poppet 18 by the fluid.

Referring briefly to FIG. 5, it is seen that a radially inward portion of O-ring 16 immediately adjacent stem 20 overlaps with clearance 50, leaving part of the outer axial surface 86 of O-ring 16 exposed to the fluid flow. This exposed portion of O-ring 16 essentially corresponds to that inner part of O-ring 16 that is not seated upon valve seat 57. This exposed portion of O-ring 16 is generally illustrated at 62 and has an annular configuration.

Therefore, during a closed valve condition, poppet 18 (via the exposed annular ring portion 62 of O-ring 16) experiences an axially-directed, pressure-related force as fluid bears against the exposed annular portion 62. In the figures, this axially-directed fluid pressure acts in the upward direction. Poppet 18 also experiences fluid pressure at the exposed axial end face of stem 20. Further elaboration of this feature will be made below in connection with FIGS. 5 and 6 and a discussion of the valve operation.

Although poppet 18 and stem 20 are shown with the indicated cylindrical shapes, this feature should not be considered in limitation of the present invention, as it should be apparent that various other shapes may be used. For example, both poppet body portion 19 and stem 20 may be provided in a form having a non-circular cross-sectional area, e.g., a square.

It is preferable, however, that the poppet valve construction be fashioned such that a principal object of the invention continues to be achieved, namely, that the surface area of poppet 18 exposed to fluid pressure during a closed condition be greater than the surface area of poppet 18 exposed to fluid pressure during an open condition.

Referring to FIGS. 3 and 4, poppet 18 is fully housed within receptacle 28 that retains poppet 18 and its cooperative components at a lower end thereof. The illustrated receptacle 28 is provided in the form of an elongate cylindrical structure having a hollowed-out lower end (resembling a tubular construction) to define an open-ended receiving chamber (generally illustrated at 64). Receptacle 28 is open at one end to insertably receive poppet 18.

As shown in FIG. 4, receptacle 28 includes outer sidewall surface portions 66 that extend axially in sleeve-like or skirt-type fashion from an axial position coincident with the closed end 68 of chamber 64 and terminate at an axial location along poppet 18. Receptacle 28, and in particular the skirt portions 66 thereof, are suitably configured to define lateral openings or orifices 70 formed at certain specified axial positions of receptacle 28 at the circumferential boundary thereof.

More specifically, orifices 70 define the valve relief ports that are disposed in sufficient fluid communicating registration with the fluid/pressure relief pathway. As discussed further in connection with FIG. 6, which depicts an open valve condition, this valve relief pathway is defined in part by a radially extending slot or passageway 72 (FIG. 6) formed between valve seat 57 and the now-unseated portion of poppet 18 (i.e., O-ring 16) disposed in opposition thereto. This unseated portion of poppet 18 otherwise lies upon valve seat 57 during a closed condition, but is axially displaced as the valve opens and becomes disposed in spaced-apart facing relationship to valve seat 57.

Poppet 18 further includes stem 22 axially projecting from the other axial end face of poppet 18 opposite stem 20 (FIGS. 3 and 4). Stem 22 is constructed similarly to stem 20. Spring 24 is annularly located about stem 22 in a manner such that one end of spring 24 proximal poppet 18 abuts against a poppet end face, while another end of spring 24 distal poppet 18 abuts against the terminal end 68 of receptacle chamber 64. As shown, spring 24 is housed within chamber 64.

Spring 24 functions in a conventional manner to provide the biasing force that determines the threshold cracking pressure of valve 10 (i.e., the moment at which poppet 18 rises to permit fluid and/or pressure relief). Below this pressure, then, spring 24 acts to urge poppet 18 towards its closed seating position relative to valve seat 57 and to maintain this seating orientation. In the figures, this biasing force is exerted in the downward axial direction.

It should be apparent that the operating pressure points of valve 10 may be adjusted in conventional fashion by appropriate selection of spring 24 having a compressibility characteristic that produces a desired biasing force. For example, a higher cracking pressure would be implemented with spring 24 having a relatively higher degree of stiffness, i.e., a relatively higher resistance to compression. For this purpose, it is a preferred aspect of the invention that valve 10 may be fully disassembled and readily re-assembled, in order to permit any of the components (such as spring 24) to be replaced.

Receptacle 28 is preferably provided with a conventional flange piece 74 defining a terminal end section of receptacle 28. Flange 74 is suitably adapted with features such as barbs 76 to facilitate the secure placement of valve 10 into the end use application, e.g., a fuel hose. Flange 74 may be provided in any suitable form or structure.

Referring to the FIG. 3 view of the assembled valve configuration, housing 12 is joined to receptacle 28 using a press fit connection therebetween. In particular, neck portion 42 of housing 12 is insertably transferred into hollowed-out receiving chamber 64 (via the axial opening formed at the end of receptacle 28) until the lowermost terminal edge of receptacle 28 abuts against a shoulder portion defined at the upper side of housing base portion 40. The relevant parts of valve 10 are constructed of suitable materials well known to those skilled in the art to facilitate the press fit connection.

It should be apparent that the joining operation involving housing 12 and receptacle 28 also includes the intermediate integration of poppet 18, spring 24, and O-ring 16 with housing 12 such that the assembled placement of housing 12 simultaneously locates the other components in their proper working relationship within valve 10.

In one form, valve 10 further includes O-ring 14 disposed within an annular groove or recess formed in the shoulder portion of housing 12 at the upper side of base portion 40. Valve 10 also includes poppet disc 26 annularly disposed (in radial spaced-apart relation) about neck portion 42 of housing 12. For this purpose, an open-sided radially-extending circumferential indent is formed at the lowermost edge of flange 74 of receptacle 28 in order to receive disc 26. In particular, the innermost radial portion of disc 26 is received within this circumferential indent.

In the final assembled form of valve 10, poppet disc 26 rests at least in part upon the shoulder-like upper side of housing base portion 40. During assembly, disc 26 would be placed about neck portion 42 and eventually become located within its final position as neck portion 42 is being press fit into the receiving chamber 64 of receptacle 28.

[INVENTOR: PLEASE DESCRIBE THE PURPOSE OF O-RING 14 AND POPPET DISC 26].

As mentioned previously, valve 10 includes various geometrical characteristics (i.e., structural and surface features) that constitute favorable design improvements over typical check ball and standard poppet configurations.

For example, valve 10 is configured and otherwise constructed such that the structural surface area which is presented (in transverse aspect) to the admitted fluid stream is greater during the closed valve condition than the open valve condition. Stated otherwise, the surface area of valve 10 that is exposed to or otherwise experiences fluid-related pressure is greater during the closed valve condition than the open valve condition.

Referring specifically to FIG. 5, which illustratively depicts the closed valve configuration, valve 10 presents the incoming fluid flow with two main exposed surface features at which fluid-related pressure is experienced. As discussed further, these features include the exposed end face of poppet stem 20 and the exposed portion of the end face of poppet 18. Notably, these surface features are oriented transversally to the direction of fluid flow.

First, fluid pressure builds at the exposed axial end face 60 of poppet stem 20. As shown, a representative fluid stream 80 exerts an axially directed pressure against the surface of stem face 60. In the embodiment shown in the figures, this surface is defined by a circular transverse cross-section. It is apparent that the fluid pressure exerted at stem face 60 acts to urge poppet 18 in the upward direction against the opposing downward biasing force of spring 24.

Second, fluid pressure builds at the exposed portion 62 of poppet 18 (i.e., O-ring 16) that is not seated on (i.e., engaged with) valve seat 57. In particular, a fluid stream 82 flows through the clearance 50 defined between poppet stem 20 (i.e., at sidewall 54) and neck portion 42 of housing 12 (i.e., at sidewall 52). The exposed portion 62 is defined by an annular-shaped ring surface. Fluid stream 82 exerts an axially-directed pressure against poppet 18. It is likewise apparent that the fluid pressure exerted at the exposed annular surface 62 acts to urge poppet 18 in the upward direction against the opposing downward biasing force of spring 24.

It is seen that the pressure-related forces experienced by poppet 18 at exposed stem face 60 and exposed annular surface 62 act constructively with one another since they have the same directionality (i.e., axial). The static pressure-related forces that develop against poppet 18 will eventually cause poppet 18 to become unseated from valve seat 57 if the cracking pressure is reached, namely, the point at which the pressure-related forces exceed the biasing force of spring 24. As known, under this condition, spring 24 will yield to the pressure and proportionately compress.

Referring now to FIG. 6, which illustratively depicts the open valve configuration (such as a cracking state), valve 10 presents the incoming fluid flow with one principal exposed surface feature at which fluid-related pressure is experienced. As discussed further, this feature includes the exposed end face of poppet stem 20.

The onset of an incipient open condition occurs simultaneously with an axial displacement of poppet 18 that disengages poppet 18 (i.e., O-ring 16) from upper deck surface 56 defining valve seat 57. As poppet 18 becomes unseated from valve seat 57, a radial slot or transverse passageway 72 is simultaneously formed between valve seat 57 and the opposing portion of O-ring 16. As shown, radial slot 72 is arranged in fluid communication with clearance 50. Radial slot 72 defines the valve relief pathway that provides fluid communication between fluid channel 48 and exit relief orifice 70 (FIG. 4).

Accordingly, fluid flowing up through clearance 50 is routed and otherwise redirected to travel through radial slot 72 as a generally transverse fluid stream 84 that eventually emerges from relief orifice 70. It may then be considered that valve 10 redirects the incoming fluid stream by ~90° as it travels through clearance 50 and passes into the relief channel 72 before exiting the valve at orifice 70.

It is seen that a static axially-directed fluid pressure continues during the open condition to be exerted upon poppet stem face 60 in the form of fluid flow 80, similar to the fluid mechanics which prevailed during a closed condition. Significantly, however, the exposed end surface of poppet 18 (i.e., at the axial outer surface 86 of O-ring 16) does not experience the axially-directed fluid pressure that was present during the closed valve condition (FIG. 5). This axial pressure component previously bearing upon poppet 18 is effectively removed once radial slot 72 is formed to define the transverse relief pathway that communicates fluid flow 84 out of the valve.

A comparison of the geometry of poppet 18 which is exposed to fluid pressure during both a closed and open valve condition reveals a significant advantage of the present invention. In particular, the surface area of poppet 18 that experiences fluid pressure during an open condition is less than the surface area of poppet 18 that experiences fluid pressure during a closed condition. This pressure characteristic remains true even when the pressure due to dynamic forces is taken into account.

The significance of this feature is that valve 10 will exhibit a rapid ON/OFF (i.e., open/close) behavior relatively soon if not immediately after valve 10 has cracked open (i.e., when poppet 18 unseats from valve seat 57). Poppet 18 will attempt to snap back into its reseating position momentarily following the cracking condition. This snap-shut feature arises because once the poppet surface area exposed to fluid pressure becomes reduced at cracking, the fluid no longer exerts a cumulative pressure that suitably exceeds the biasing force of spring 24, which otherwise is needed to keep the valve open.

Rather, assuming a constant pressure differential across the valve, the reduced surface area causes a corresponding reduction in the effective fluid pressure-related force exerted against poppet 18. If this reduced force falls below the biasing force of spring 24, the spring action will prevail and thereafter attempt to immediately displace (and thereby reseat) poppet 18.

This snap-shut behavior is highly advantageous because the process of relieving pressure typically only requires a momentary and transient release of fluid characterized by a low-volume, spurt-like action. It may alternately be considered that the valve bleeds off fluid in a squirt-type action to relieve pressure. A transient fluid release is preferable because it avoids the formation of a steady continuous fluid stream. Even if such a stream is temporary in duration, it still would result in unwanted fluid loss, since only a quick and momentary leakage of fluid is typically sufficient.

Valve 10 may be suitably designed to exhibit a certain responsivity to pressure after the valve cracks open. For example, poppet 18 and valve 20 may be suitably dimensioned to define surface areas exposed to fluid pressure that result in a certain snap-shut behavior having desired operational characteristics. Parameters such as the duration of the cracking interval may be controlled by appropriately designing the valve.

For example, among valves that otherwise are the same, a reduction in the transverse cross-sectional surface area of stem face 60 of one of the valves will result in a faster reseat action (and smaller crack open duration) since the comparatively lower exposed surface area causes a lower pressure-related force to be exerted against the poppet.

As used herein, the momentary or transient fluid leakage feature attending the behavior of the valve at cracking is a relative concept that should be understood as encompassing the spectrum of conditions from an instantaneous shut-off to an open condition that persists for a defined amount of time, e.g., a span of several seconds. This feature distinguishes from the cracking behavior of conventional valves where steady fluid streams develop for an indefinite time period, absent a change in pressure.

This squirt-type behavior of the present invention at cracking point distinguishes over conventional valves where the surface area of the valve exposed to fluid pressure actually increases after cracking, causing a further increase in the pressure-related force acting against the exposed valve surfaces. Compared to the present invention, which features a snap-shut response to cracking, conventional valves act oppositely in that the valve not only remains open but attempts to become progressively more open. It is apparent that the valve responses are entirely different.

The following discussion illustrates a typical performance test involving valve 10 of the present invention. The individual pressure values and ranges are provided for illustrative purposes only, as it should be apparent that valve 10 may be used with any other suitable pressure characteristics, in a manner known to those skilled in the art.

According to one form of the valve performance test, the system is initially primed by applying fluid pressure to the relief valve until test fluid emerging from the valve is visibly detected. Fluid pressure is steadily applied to the system until the valve cracks open. In one form, the valve is designed to crack open between 37 and 50 psi. The system pressure is then reduced from cracking pressure to about 33 psi. It is preferable that the valve be able to hold this pressure such that there is no more than a 1 psi pressure drop in a 15 second time span.

It is seen that 33 psi would represent the pressure balance point at which any appreciable variation in the pressure could prompt the valve to open further or shut completely (i.e., when the poppet reseats). This holding pressure is less than the observed cracking pressure due to various types of inertial resistance (e.g., part sticking, hysteresis, or lag) that the static fluid pressure must overcome in addition to the spring bias force, before cracking occurs.

A further advantage of the invention is that once cracking occurs, the valve is proportionately responsive to variations in the pressure in order to increase the valve relief opening (i.e., the size of radial relief slot 72) (FIG. 6). In particular, proportional changes in the axial displacement of poppet 18 may be implemented with corresponding changes in the system pressure. As a result, the valve will release fluid in a controlled regulated manner where the leakage rate will vary commensurately with the pressure changes. A gradual and proportional decrease in the leakage rate can be similarly accomplished with reductions in the system pressure.

By comparison, in conventional valves, the leakage rate increases in an unbounded and relatively unrestrained manner since the increased surface area exposed to fluid pressure (following cracking) will perpetuate and lead to yet further surface area increases as the valve continues to open, resulting in larger forces being brought to bear against the bias element.

It can be seen, then, that the valve of the present invention offers a wide pressure range between cracking state and full open state over which varying degrees of leakage (each corresponding to a certain open condition or size of the relief pathway) can be realized. By comparison, in conventional valves, the pressure range between cracking and full open is relatively narrower, due to the intrinsic tendency of the valve to automatically increase its relief aperture once cracking has occurred, even without appreciable pressure increases.

Additionally, the valve of the present invention offers a narrower operating range pertaining to the onset and occurrence of the cracking state and subsequent reseating. In particular, due to the intrinsic tendency of the valve to shut off virtually immediately after the valve snaps open at cracking, the valve will reseat in a very near pressure to the cracking pressure point. By comparison, in conventional valves, due to the intrinsic tendency of the valve to relax and continue opening, a significant pressure drop will be required to offset the increase in valve surface area that is exposed to fluid pressure and thereby induce the valve into reseating.

It should be understood that the particular geometrical construction, shape and dimensioning of valve 10 (particularly poppet 18 and stem 20) is simply illustrative of one form of the invention and should not be considered in limitation thereof. It should be understood that the present invention encompasses any poppet-stem configuration having a surface area exposed to fluid pressure during an open valve condition that is less than its surface area exposed to fluid pressure during a closed valve condition.

Various features and aspects are evident from the valve of the present invention. The valve provides an immunity to contaminants, a narrow spread for cracking to reseat pressure points, a low volume flow rate at full flow condition, and reliable consistent operating points.

The valve employs a stem to meter fluid at all conditions. The benefits to using a poppet stem include, inter alia, a reduced and more manageable flow rate in the full open condition (relative to a check ball design), predictable operating points and characteristics, stable operation, and minimal difference between crack reseat and full flow reseat. Additionally, the metering stem is less susceptible to contaminants, where the sealing components employed in the valve will conform to small particulates. The flow path is suitably configured to enable the valve to be virtually self-cleaning.

The poppet stem which locates the biasing spring is used to limit spring travel. This prevents excessive compression of the spring and ensures longevity and linearity in the operating characteristics of the spring. By comparison, check ball designs do not have a feature that limits the compression of the spring.

Typical relief check valve designs use a check ball to act as a valve and seal. In the invention, the valve employs an O-ring seat instead of a flat disc elastomer or a check ball.

The cylinder poppet and stem combination prevent misalignment of the seating surfaces since there is little or no possibility of side-to-side drifting, as appears in check ball valves. The metering stem remains within the fluid channel at all times and therefore accurately and consistently pilots the poppet movement. At no point, then, does the poppet assume a "free-floating" state as with check balls, which allows external influences such as the fluid pressure to displace the ball out of alignment with its valve seat.

Check ball designs are affected by dynamic forces (drag) as fluid flows over and around the ball. In the invention, the valve redirects fluid to exit 90° from the axis of the incoming fluid, thereby preventing fluid flow along and about the longitudinal surfaces of the poppet cylinder, which otherwise could create dynamic drag forces.

In the valve construction of the invention, the dynamic forces are reduced by reducing the area of the flow path, while maintaining the static forces required to operate the valve at predetermined points through the use of the metering stem. The poppet surface area exposed to fluid pressure is reduced after the valve begins to open.

The restricted fluid path reduces, significantly, the dynamic forces normally acting on the surface of the valve face. The resultant surface area (during an open condition) is that of the stem face. Since this is less than the surface area of the closed valve, greater pressure is required to keep the valve open. Stated otherwise, the bias spring exerts an increased force against the fluid for the same pressure differential across the valve. This causes the reseat pressure to momentarily be greater than the cracking point so the valve tries to close immediately.

By comparison, for the same differential pressure and initial surface area, a check ball or standard poppet valve will allow a larger volume of fluid to pass than the valve of the invention.

Moreover, the reaction time from open to close is less for the invention than a check ball or standard poppet valve design.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A valve assembly, comprising:
   a housing having a fluid inlet end and a fluid outlet end;
   a poppet having a first stem extending from an axial end face of said poppet, the first stem being slidably received at least in part within the fluid outlet end of said housing, the first stem being suitably configured so as to be disposed in continuously non-contacting, spaced-apart relationship to said housing;
   an elongate receptacle having an inner chamber formed at a lower end thereof to house said poppet;
   said housing includes a base and a throat portion disposed on said base, the throat portion defining a fluid channel formed therein receiving the first poppet stem, the throat portion being disposed at least in part within the inner chamber of said elongate receptacle;
   a disc annularly disposed about the throat portion of said housing and overlying at least in part an upper side of the housing base; and
   said elongate receptacle includes a lower end body portion having a circumferential indent formed at the lowermost edge thereof, wherein said disc being annularly disposed about said elongate receptacle at the circumferential indent of the lower end body portion thereof;
   wherein the axial end face of said poppet being disposed transversely to an axial dimension of said valve assembly.

2. The assembly as recited in claim 1, wherein the effective surface area of the transverse aspect of said poppet exposed to fluid pressure during a closed valve condition being greater than the effective surface area of the transverse aspect of said poppet exposed to fluid pressure during an open valve condition.

3. The assembly as recited in claim 2, wherein:
the effective surface area of the transverse aspect of said poppet exposed to fluid pressure during a closed valve condition being defined substantially by an axial end face of said first poppet stem and a portion of the axial end face of said poppet; and
the effective surface area of the transverse aspect of said poppet exposed to fluid pressure during an open valve condition being defined substantially by the axial end face of said first poppet stem.

4. The assembly as recited in claim 2, wherein:
the effective surface area of the transverse aspect of said poppet exposed to fluid pressure during a closed valve condition being associated with a transverse dimension of said poppet longer than the transverse extent of said first poppet stem; and
the effective surface area of the transverse aspect of said poppet exposed to fluid pressure during an open valve condition being associated with a transverse dimension of said poppet substantially equal to the transverse extent of said first poppet stem.

5. The assembly as recited in claim 2, wherein:
the effective surface area of the transverse aspect of said poppet exposed to fluid pressure during a closed valve condition being associated with a transverse dimension of said poppet coextensive with the transverse extent of said first poppet stem and the transverse extent of at least one lateral clearance defined between said first poppet stem and said housing at the fluid outlet end thereof; and
the effective surface area of the transverse aspect of said poppet exposed to fluid pressure during an open valve condition being associated with a transverse dimension of said poppet substantially equal to the transverse extent of said first poppet stem.

6. The assembly as recited in claim 1, wherein said poppet includes a first pressure bearing surface feature experiencing fluid-related pressure during a closed valve condition, said poppet further includes a second pressure bearing surface feature experiencing fluid-related pressure during an open valve condition.

7. The assembly as recited in claim 6, wherein the surface area of the first pressure bearing poppet surface feature being larger than the surface area of the second pressure bearing poppet surface feature.

8. The assembly as recited in claim 7, wherein the second pressure bearing poppet surface feature being defined by an axial end face of the first poppet stem, and wherein the first pressure bearing poppet surface feature being defined by the axial end face of the first poppet stem and at least a portion of the axial end face of said poppet.

9. The assembly as recited in claim 1, wherein said poppet being configured to define a first surface feature experiencing fluid pressure during a closed valve condition and a second surface feature experiencing fluid pressure during an open valve condition, the surface area of the first poppet surface feature being larger than the surface area of the second poppet surface feature.

10. The assembly as recited in claim 1, wherein said poppet includes a cylindrical body.

11. The assembly as recited in claim 1, further comprises: a means to filter fluid operatively flowing through said housing.

12. The assembly as recited in claim 1, further comprises: an in-line fluid filter disposed in said housing.

13. The assembly as recited in claim 1, further includes a spring disposed about a second stem of said poppet, the first stem and the second stem being disposed at opposite ends of said poppet.

14. The assembly as recited in claim 1, further comprises a ring element annularly disposed about the first poppet stem.

15. The valve assembly as recited in claim 1, further includes:
a clearance defined between the first stem at an outer peripheral surface thereof and the housing at an inner peripheral surface thereof, the inner peripheral surface of said housing being disposed in facing opposition to the outer peripheral surface of the first stem.

16. The valve assembly as recited in claim 15, wherein the clearance being maintained throughout an open condition and a closed condition of said valve assembly.

17. The valve assembly as recited in claim 1, wherein the axial end face of said poppet includes an unseated surface disposed immediately annularly about the first stem.

18. The valve assembly as recited in claim 17, wherein the unseated surface of said poppet being radially coextensive with a clearance defined between the first stem and said housing.

19. The valve assembly as recited in claim 17, wherein the unseated surface of said poppet and an axial end face of the first stem cooperatively defining a pressure bearing surface of said valve assembly during a closed condition.

20. A valve assembly, comprising:
a housing having a fluid inlet end and a fluid outlet end;
a valve poppet having a body and a fluid metering stem extending therefrom, said fluid metering stem being operatively disposed at least in part within the fluid outlet end of said housing, said fluid metering stem being suitably configured so as to be disposed in continuously non-contacting, spaced-apart relationship to said housing;
said valve poppet being configured to define a first surface feature acting during a closed valve condition to oppose the flow of fluid and a second surface feature acting during an open valve condition to oppose the flow of fluid;
an elongate receptacle having an inner chamber formed at a lower end thereof to house said valve poppet;
said housing includes a base and a throat portion disposed on said base, the throat portion defining a fluid channel formed therein receiving the fluid metering stem, the throat portion being disposed at least in part within the inner chamber of said elongate receptacle;
a disc annularly disposed about the throat portion of said housing and overlying at least in part an upper side of the housing base; and
said elongate receptacle includes a lower end body portion having a circumferential indent formed at the lowermost edge thereof, wherein said disc being annularly disposed about said elongate receptacle at the circumferential indent of the lower end body portion thereof;
wherein the surface area of the first valve poppet surface feature being larger than the surface area of the second valve poppet surface feature.

21. The assembly as recited in claim 20, wherein:
the first valve poppet surface feature includes an axial end face of the fluid metering stem and at least a portion of an axial end face of said valve poppet body; and the second valve poppet surface feature includes the axial end face of the fluid metering stem.

22. The valve assembly as recited in claim 20, further includes:
a clearance defined between the fluid metering stem at an outer peripheral surface thereof and the housing at an inner peripheral surface thereof, the inner peripheral surface of said housing being disposed in facing opposition to the outer peripheral surface of the fluid metering stem.

23. The valve assembly as recited in claim 22, wherein the clearance being maintained throughout an open condition and a closed condition of said valve assembly.

24. The valve assembly as recited in claim 20, wherein an axial end face of said valve poppet includes an unseated surface disposed immediately annularly about the fluid metering stem.

25. The valve assembly as recited in claim 24, wherein the unseated surface of said valve poppet being radially coextensive with a clearance defined between the fluid metering stem and said housing.

26. The valve assembly as recited in claim 24, wherein the unseated surface of said valve poppet and an axial end face of the fluid metering stem cooperatively defining a pressure bearing surface of said valve assembly during a closed condition.

27. A valve assembly, comprising:
a valve body including a fluid inlet end and a fluid outlet end;
a poppet having a fluid metering stem operatively disposed at least in part within the fluid outlet end of said valve body, said fluid metering stem being suitably configured so as to be disposed in continuously non-contacting, spaced-apart relationship to said valve body;
said poppet being configured to define a first surface feature experiencing fluid pressure during a closed valve condition and a second surface feature experiencing fluid pressure during an open valve condition;
an elongate receptacle having an inner chamber formed at a lower end thereof to house said poppet;
said valve body includes a base and a throat portion disposed on said base, the throat portion defining a fluid channel formed therein receiving the fluid metering stem, the throat portion being disposed at least in part within the inner chamber of said elongate receptacle;
a disc annularly disposed about the throat portion of said valve body and overlying at least in part an upper side of the valve body base; and
said elongate receptacle includes a lower end body portion having a circumferential indent formed at the lowermost edge thereof, wherein said disc being annularly disposed about said elongate receptacle at the circumferential indent of the lower end body portion thereof;
wherein the surface area of the first poppet surface feature being larger than the surface area of the second poppet surface feature.

28. The assembly as recited in claim 27, wherein the first surface feature and the second surface feature of said poppet being wholly disposed in a direction transverse to an axial dimension of said valve assembly.

29. The assembly as recited in claim 27, wherein:
the first poppet surface feature includes an axial end face of the fluid metering stem and at least a portion of an axial end face of a body of said poppet; and
the second poppet surface feature includes the axial end face of the fluid metering stem.

30. The valve assembly as recited in claim 27, further includes:
a clearance defined between the fluid metering stem at an outer peripheral surface thereof and the valve body at an inner peripheral surface thereof, the inner peripheral surface of said valve body being disposed in facing opposition to the outer peripheral surface of the fluid metering stem.

31. The valve assembly as recited in claim 30, wherein the clearance being maintained throughout an open condition and a closed condition of said valve assembly.

32. The valve assembly as recited in claim 27, wherein an axial end face of said poppet includes an unseated surface disposed immediately annularly about the fluid metering stem.

33. The valve assembly as recited in claim 32, wherein the unseated surface of said poppet being radially coextensive with a clearance defined between the fluid metering stem and said valve body.

34. The valve assembly as recited in claim 32, wherein the unseated surface of said poppet and an axial end face of the fluid metering stem cooperatively defining a pressure bearing surface of said valve assembly during a closed condition.

35. A valve apparatus, comprising:
a housing having a fluid inlet end and a fluid outlet end;
a poppet having a body and a first stem extending axially from said body, said first stem being slidably received at least in part within the fluid outlet end of said housing, said first stem being suitably configured so as to be disposed in continuously non-contacting, spaced-apart relationship to said housing, said poppet body and said first poppet stem each having a respective substantially uniform transverse cross-section;
an elongate receptacle having an inner chamber formed at a lower end thereof to house said poppet;
said housing includes a base and a throat portion disposed on said base, the throat portion defining a fluid channel formed therein receiving the first poppet stem, the throat portion being disposed at least in part within the inner chamber of said elongate receptacle;
a disc annularly disposed about the throat portion of said housing and overlying at least in part an upper side of the housing base; and
said elongate receptacle includes a lower end body portion having a circumferential indent formed at the lowermost edge thereof, wherein said disc being annularly disposed about said elongate receptacle at the circumferential indent of the lower end body portion thereof.

36. The valve apparatus as recited in claim 35, further includes:
a clearance defined between the first stem at an outer peripheral surface thereof and the housing at an inner peripheral surface thereof, the inner peripheral surface of said housing being disposed in facing opposition to the outer peripheral surface of the first stem.

37. The valve apparatus as recited in claim 36, wherein the clearance being maintained throughout an open condition and a closed condition of said valve apparatus.

38. The valve apparatus as recited in claim 35, wherein an axial end face of said poppet body includes an unseated surface disposed immediately annularly about the first stem.

39. The valve apparatus as recited in claim 38, wherein the unseated surface of said poppet being radially coextensive with a clearance defined between the first stem and said housing.

40. The valve apparatus as recited in claim 38, wherein the unseated surface of said poppet and an axial end face of the first stem cooperatively defining a pressure bearing surface of said valve apparatus during a closed condition.

41. A valve apparatus, comprising:
   a housing having a fluid inlet end and a fluid outlet end;
   a poppet having a right circular cylindrical body and a first stem extending from said body, said first stem being slidably received at least in part within the fluid outlet end of said housing, said first stem being suitably configured so as to be disposed in continuously non-contacting, spaced-apart relationship to said housing;
   an elongate receptacle having an inner chamber formed at a lower end thereof to house said poppet;
   said housing includes a base and a throat portion disposed on said base, the throat portion defining a fluid channel formed therein receiving the first poppet stem, the throat portion being disposed at least in part within the inner chamber of said elongate receptacle;
   a disc annularly disposed about the throat portion of said housing and overlying at least in part an upper side of the housing base; and
   said elongate receptacle includes a lower end body portion having a circumferential indent formed at the lowermost edge thereof, wherein said disc being annularly disposed about said elongate receptacle at the circumferential indent of the lower end body portion thereof.

42. The valve apparatus as recited in claim 41, further includes:
   a clearance defined between the first stem at an outer peripheral surface thereof and the housing at an inner peripheral surface thereof; the inner peripheral surface of said housing being disposed in facing opposition to the outer peripheral surface of the first stem.

43. The valve apparatus as recited in claim 42, wherein the clearance being maintained throughout an open condition and a closed condition of said valve apparatus.

44. The valve apparatus as recited in claim 41, wherein an axial end face of said poppet body includes an unseated surface disposed immediately annularly about the first stem.

45. The valve apparatus as recited in claim 44, wherein the unseated surface of said poppet being radially coextensive with a clearance defined between the first stem and said housing.

46. The valve apparatus as recited in claim 44, wherein the unseated surface of said poppet and an axial end face of the first stem cooperatively defining a pressure bearing surface of said valve apparatus during a closed condition.

47. A valve assembly, comprising:
   a housing having a fluid inlet end and a fluid outlet end, said housing having an upper portion proximate the fluid outlet end defining a valve seat;
   a poppet having a fluid metering stem operatively disposed at least in part within the fluid outlet end of said housing, said fluid metering stem being suitably configured so as to be disposed in continuously non-contacting, spaced-apart relationship to said housing;
   an elongate receptacle having an inner chamber formed at a lower end thereof to house said poppet;
   said housing includes a base and a throat portion disposed on said base, the throat portion defining a fluid channel formed therein receiving the fluid metering stem, the throat portion being disposed at least in part within the inner chamber of said elongate receptacle;
   a disc annularly disposed about the throat portion of said housing and overlying at least in part an upper side of the housing base; and
   said elongate receptacle includes a lower end body portion having a circumferential indent formed at the lowermost edge thereof, wherein said disc being annularly disposed about said elongate receptacle at the circumferential indent of the lower end body portion thereof;
   wherein said valve seat and a portion of said poppet opposing said valve seat defining at least one pressure relief passageway.

48. The assembly as recited in claim 47, wherein each pressure relief passageway being disposed substantially transversally to an axial dimension of said valve assembly.

49. The valve assembly as recited in claim 47, further includes:
   a clearance defined between the fluid metering stem at an outer peripheral surface thereof and the housing at an inner peripheral surface thereof, the inner peripheral surface of said housing being disposed in facing opposition to the outer peripheral surface of the first stem.

50. The valve assembly as recited in claim 49, wherein the clearance being maintained throughout an open condition and a closed condition of said valve assembly.

51. The valve assembly as recited in claim 47, wherein an axial end face of said poppet includes an unseated surface disposed immediately annularly about the fluid metering stem.

52. The valve assembly as recited in claim 51, wherein the unseated surface of said poppet being radially coextensive with a clearance defined between the fluid metering stem and said housing.

53. The valve assembly as recited in claim 51, wherein the unseated surface of said poppet and an axial end face of the fluid metering stem cooperatively defining a pressure bearing surface of said valve assembly during a closed condition.

* * * * *